US007102790B2

(12) United States Patent
Piatt et al.

(10) Patent No.: US 7,102,790 B2
(45) Date of Patent: Sep. 5, 2006

(54) SIMPLIFIED TONE SCALE CORRECTION

(75) Inventors: Michael J. Piatt, Dayton, OH (US); Terry Wozniak, Springfield, OH (US); Joseph P. Mangan, Granger, IN (US)

(73) Assignee: Eastman Kodak Company, Rochester, NY (US)

( * ) Notice: Subject to any disclaimer, the term of this patent is extended or adjusted under 35 U.S.C. 154(b) by 978 days.

(21) Appl. No.: 10/008,825

(22) Filed: Nov. 13, 2001

(65) Prior Publication Data

US 2003/0090727 A1 May 15, 2003

(51) Int. Cl.
*H04N 1/40* (2006.01)

(52) U.S. Cl. ....................................... 358/3.1; 358/3.09

(58) Field of Classification Search ................. 358/1.9, 358/2.1, 3.06–3.12, 504, 406; 347/15, 19, 347/131

See application file for complete search history.

(56) References Cited

U.S. PATENT DOCUMENTS 5,995,714 A * 11/1999 Hadley et al. ............... 358/1.9
6,230,622 B1 * 5/2001 Dilling ....................... 101/484
6,431,679 B1 * 8/2002 Li et al. ....................... 347/19
6,484,631 B1 * 11/2002 Degani et al. .............. 101/171
6,851,785 B1 * 2/2005 Wu et al. ..................... 347/19
6,906,828 B1 * 6/2005 VanDuyn et al. ............ 358/2.1

FOREIGN PATENT DOCUMENTS

JP 2002199235 A * 7/2002

* cited by examiner

*Primary Examiner*—Thomas D. Lee
*Assistant Examiner*—Stephen Brinich
(74) *Attorney, Agent, or Firm*—Barbara Jean Haushalter; William R. Zimmerli

(57) ABSTRACT

A system and method are provided for linearizing the tone scale of individual colors in a multi-color printing system, by deriving a prescribed tone scale of individual colors in a single or multi-color printing system. Full linear ink gradations are printed on multiple substrates, and a linearization table is generated with multiple points for each of the multiple substrates and/or ink gradations. A polynomial curve is fitted to the points of each linearization table to generate polynomial curves. At least one point in the polynomial curves is selected, that shows high variation from one curve to a next curve, and coefficients of a group of polynomial curves are plotted as functions of the value of the at least one point. The range of prediction can be as narrow or as broad as an application requires. Finally, a prescribed tone scale table is derived from the polynomial curves and the at least one point. A measured set of values can be compared against a predefined database, and the most applicable transformation is then selected. The data can be corrected to any suitable curve shape.

21 Claims, 9 Drawing Sheets

SIMPLIFIED TONE SCALE CORRECTION

TECHNICAL FIELD

The present invention relates to image processing, and, more particularly, to linearizing the tone scale of individual colors in a multi-colored printing system.

BACKGROUND ART

Various techniques are known for digital printers to provide continuous tone (monochrome or color) printing. In certain printing systems, the application of a linear gradation of ink to a substrate does not result in the appearance of a linear gradation in tone. Dither patterns are used to create tone gradations for a digital printing system that always prints uniformly equal size droplets. Images must be data corrected such that, when printed on a given printing configuration and substrate, they will appear to have a linear tone scale. In the past, it has been necessary to print and measure samples of various droplets per unit area on the paper in order to determine the appropriate transformation to apply to image data. This large number of measurements required the use of a spectrophotometer attached to a automatic traversing system.

Tone nonlinearity is a strong function of the ink and substrate selection. Additionally, various printing system configurations and substrates will require different maximum ink limits. Problems such as a loss of edge definition due to ink bleed, and difficulties in drying the substrate are factors that determine the upper ink limit. As conditions on the printing system and substrate types may change regularly, it is often necessary to determine new linearizing transformations on a regular basis.

It would be desirable to be able to determine an appropriate transformation of images to be printed on a given system in order to optimize image quality.

SUMMARY OF THE INVENTION

The present invention relates to a determination of an appropriate transformation of images to be printed on a printing system to optimize image quality, by linearizing the tone scale of individual colors in a multi-color printing system. A linear printed tone scale is derived from the substrate color to the point of maximum colorant saturation, using limited measurement data fit to a model of the ink and substrate interaction.

In accordance with one aspect of the present invention, a method is provided for linearizing the tone scale of individual colors in a multi-color printing system, by deriving a prescribed tone scale of individual colors in a single or multi-color printing system. The method comprises the steps of printing full linear ink gradations on multiple substrates and generating a linearization table with multiple points for each of the multiple substrates and/or ink gradations. A polynomial curve is fitted to the points of each linearization table to generate polynomial curves. At least one point in the polynomial curves is selected, that shows high variation from one curve to a next curve, and coefficients of a group of polynomial curves are plotted as functions of the value of the at least one point. The range of prediction can be as narrow or as broad as an application requires. Finally, a prescribed tone scale table is derived from the polynomial curves and the at least one point. A measured set of values can be compared against a predefined database, and the most applicable transformation is then selected. The data can be corrected to any suitable curve shape, such as, but not limited to, a linearization.

Other objects and advantages of the invention will be apparent from the following description, the accompanying drawings and the appended claims.

DETAILED DESCRIPTION OF THE PREFERRED EMBODIMENTS

The present invention identifies a simplified method for determining an appropriate transformation of images to be printed on a given system in order to optimize image quality. Only a few measurements are required by the instrumentation greatly simplifying the procedure. A manually operated spectrophotometer is sufficient. This device is less expensive and more portable than the automatic traversing system that is required to measure a large number of printed color patches.

The transformations are determined using limited data from a test page that is printed on the specific printing system and substrate. The data gathered from the test page is compared to stored information defining the shapes of the linearizing transformations of previously examined substrates. The data from the test page is used in conjunction with the stored data to determine the most likely transformation necessary to generate a linear tone scale for the given substrate. The present invention also allows the user set a limit on the maximum amount of ink that will be applied to the substrate. Thus, the present invention produces a transformation that provides a linear tone scale between the color of the substrate and the color of the maximum amount of ink identified for a specific substrate and ink set. Most importantly, this is accomplished by collecting a minimal amount of data from the printed test page.

The system of the present invention offers increased response time for pre-press image processing operations. It can be performed directly on the press. This is a particular advantage for roll-to-roll paper applications. There is no need to cut a calibration sheet out of the paper roll to perform tone scale calibration off line.

Figure 1:
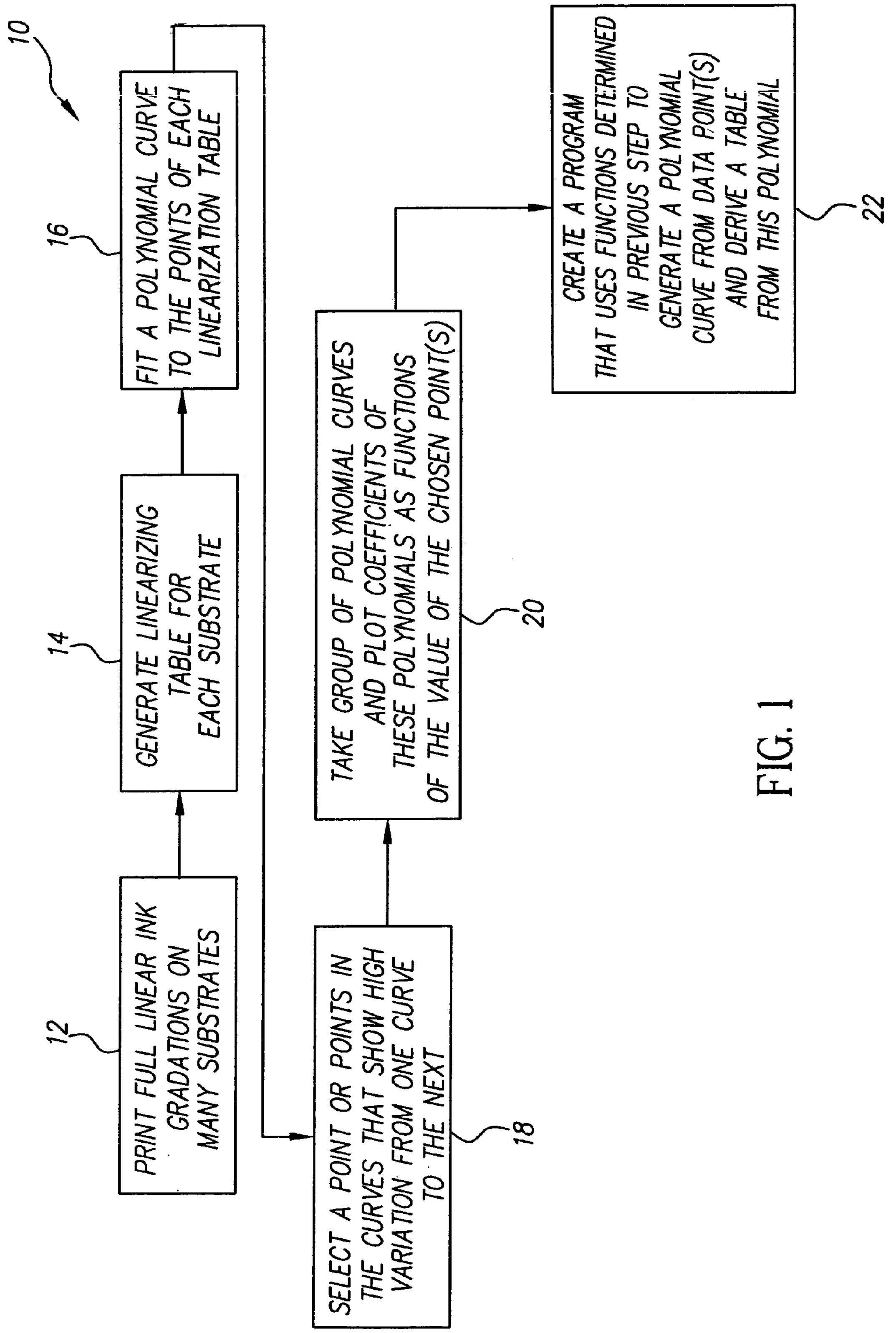
FIG. 1 is a flowchart block diagram of the linearization method according to the present invention.

The operation of the improved method of linearization according to the present invention is based on a software utility that accurately predicts data transformations based upon previously determined performance of the system. The general schematic of the software utility is shown in FIG. 1. Following the block diagram 10 of FIG. 1, the first step at block 12 in creating the linearization utility is to print the full tone range of a specified ink on a given substrate. This data is scanned with a spectrophotometer and used to create a linearizing table, as shown by block 14. At block 16, a polynomial is fit to the curve representing the tone scale transformation. Next, a single ink level of the transfer function is identified, as indicated at block 18. Typically this point is selected to be one that varies significantly from one curve to the next. At block 20, the ratio of this point to the maximum tone level is determined and plotted against the known coefficients of the polynomial fit to the curve. A line is fit to this data. Other polynomials can be fit to this function as well. Finally, at block 22, given the ratio of the selected point to the maximum tone value, the values of the different coefficients of the tone scale transformation curve can be calculated from the coefficient functions. This allows a user to create a program that uses functions determined at block 20 to generate a polynomial curve from the data point or points, and derive a table from this polynomial.

Figure 2:
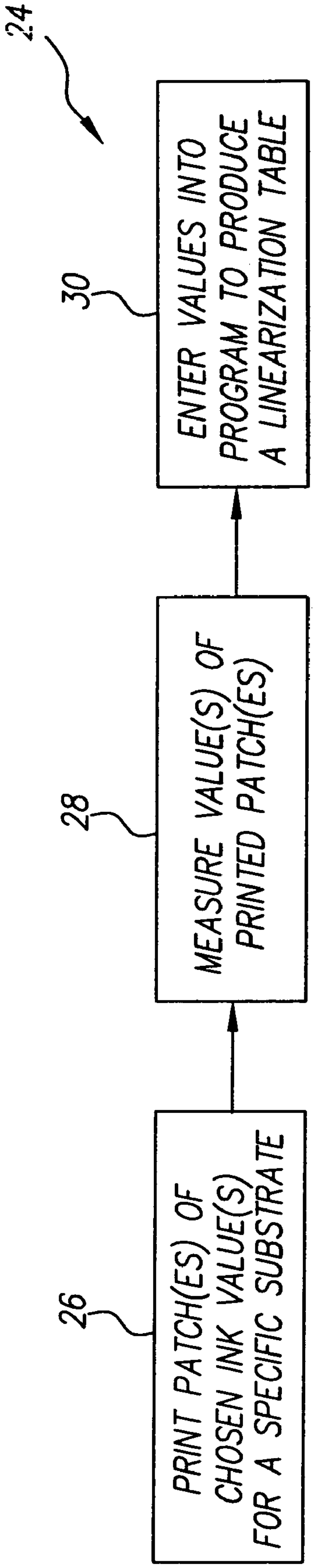
FIG. 2 is a second flowchart block diagram applying the linearization utility of FIG. 1.

In FIG. 2, there is illustrated a second block diagram 24, identifying the user procedures for making use of the prediction, illustrated in FIG. 1, of the tone scale curve derived from only two points. Initially in FIG. 2, the user prints a test image, as shown at block 26. Next, at block 28, the maximum ink level and the selected ink level patches are measured with a spectrophotometer. Finally, at block 30, this data is input into a software utility that predicts the correct tone scale transformation that results in a linear tone response.

Figure 10:
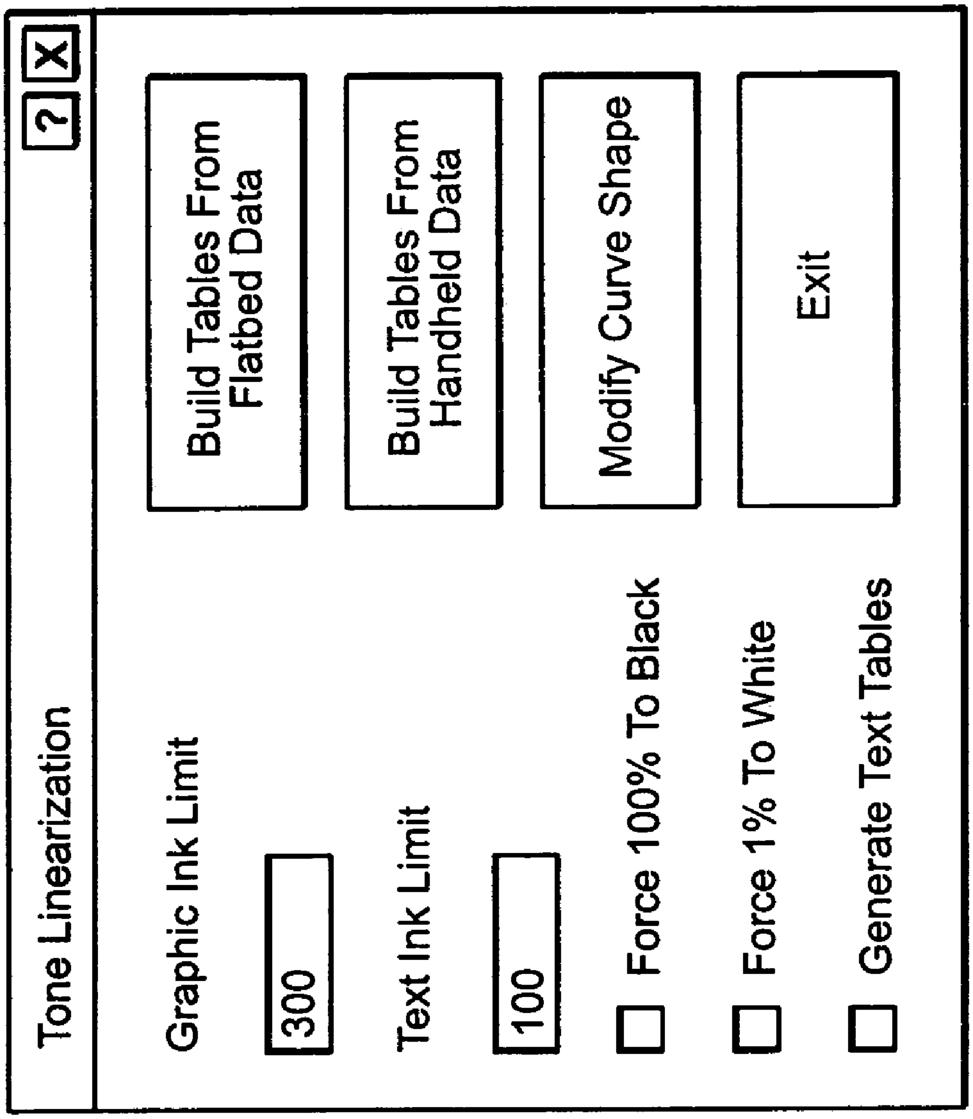
FIG. 10 shows an exemplary screen image for the user interface for inputting values of measured points into a transformation derivation.

The block diagram of this tone scale determination scheme is shown schematically in FIGS. 1 and 2. The user interface for the software that performs the functions of the processes defined in both FIGS. 1 and 2 is shown in FIG. 10. The "BUILD TABLES FROM FLATBED DATA" selection is the more rigorous method. It involves using only the first three blocks 10, 12 and 14, defined in FIG. 1. The "BUILD TABLES FROM HANDHELD DATA" is the simplified approximation method defined in the latter steps of FIG. 1 and on through FIG. 2. The approximation methods employed in FIG. 2 represent inventive aspects of the present invention.

Figure 3:
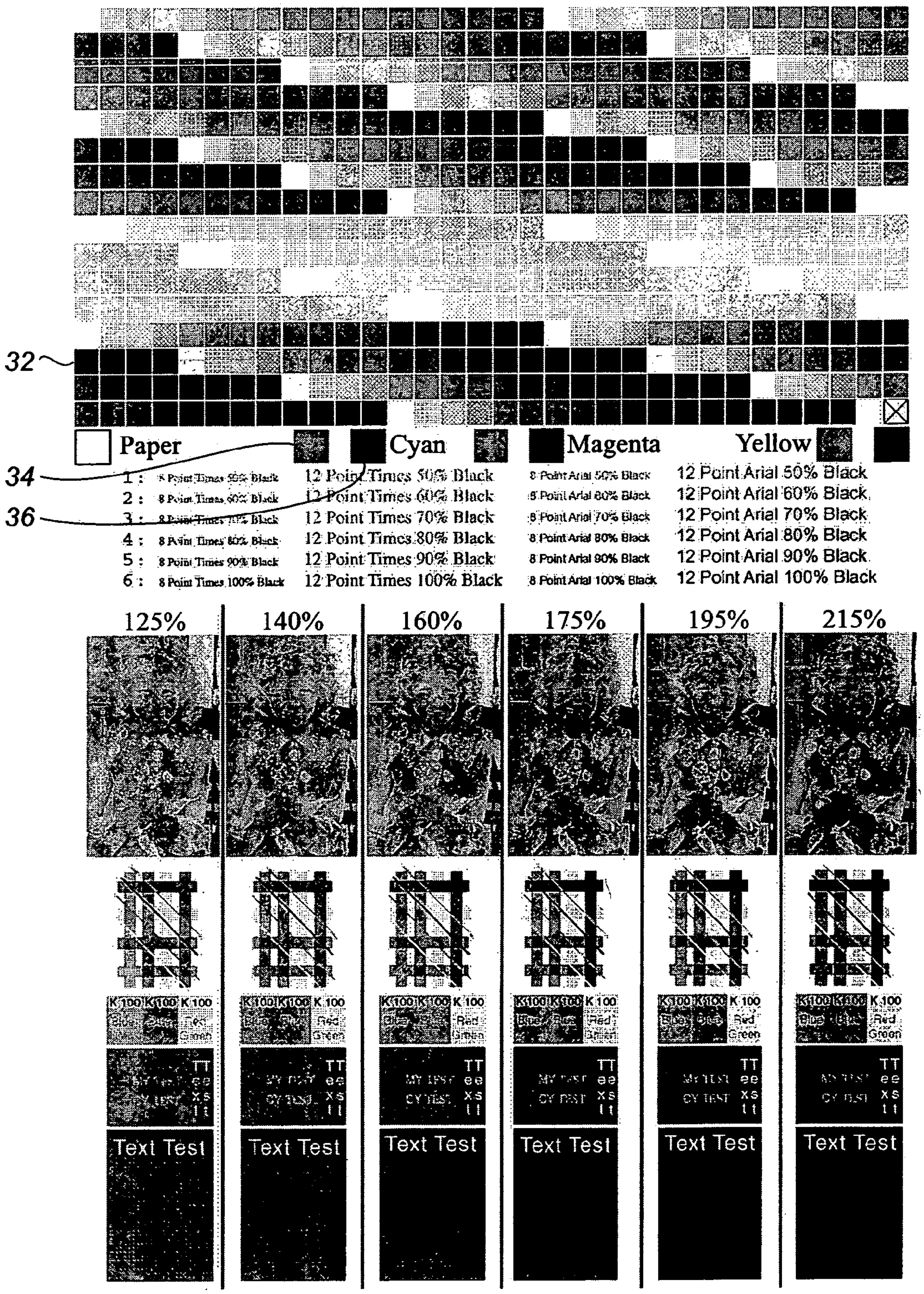
FIG. 3 is an exemplary test image for printing on the press for application of the linearization method of the present invention.

An example test image to be printed on the press for application of this invention is shown in FIG. 3. It is appreciated that the design of this test image is dependent upon the printing technology. Persons skilled in the art will understand that any number of such images are suitable for application of this invention. In a preferred embodiment of the invention, the test image should be printed without modification to the data. The tone scale 32 in FIG. 3 is the result of printing equally increasing amounts of ink per unit area over the full tonal range. Measurement of this data results in a nonlinear density per unit of ink application, as shown in FIG. 4.

Figure 4:
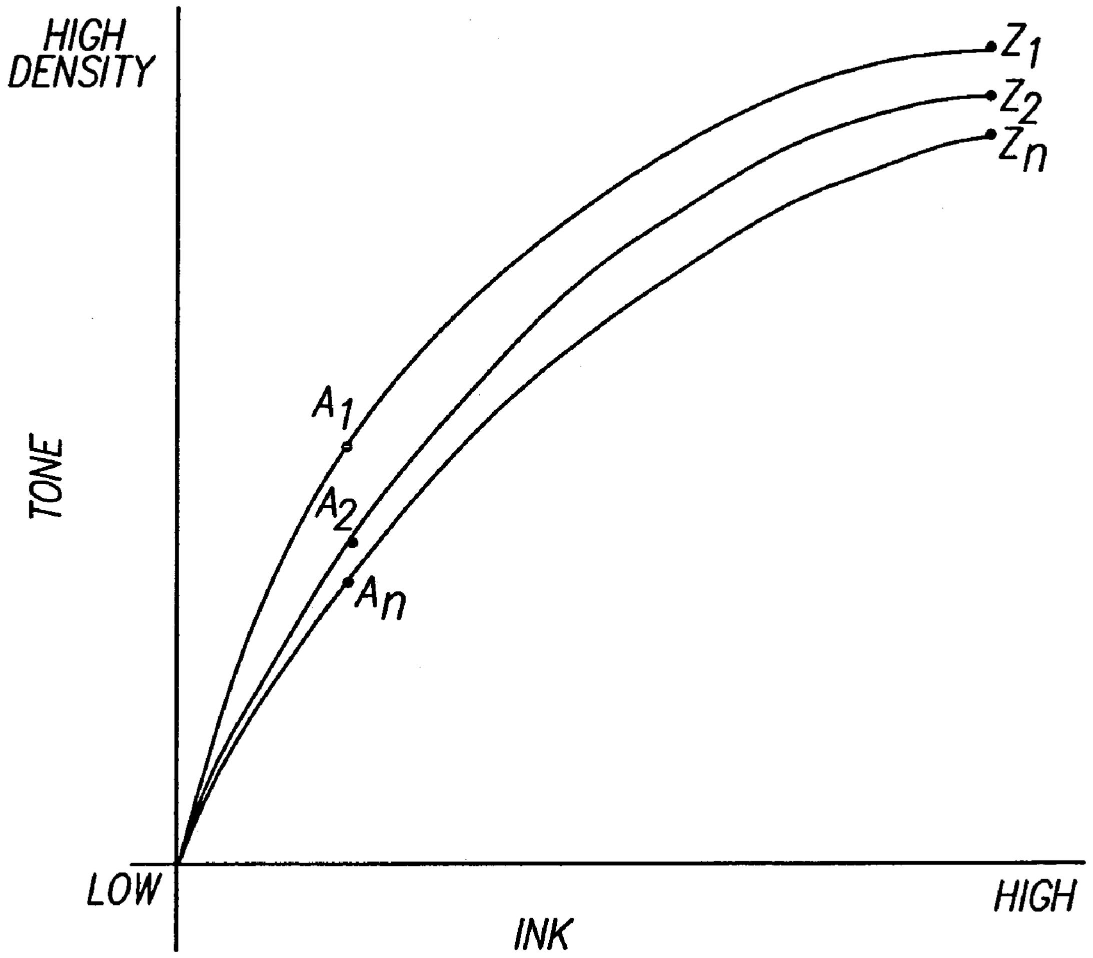
FIG. 4 is a graphic representation of a density function, taken from measurement of data from the test page of FIG. 3 which results in a nonlinear density per unit of ink application.
Figure 5:
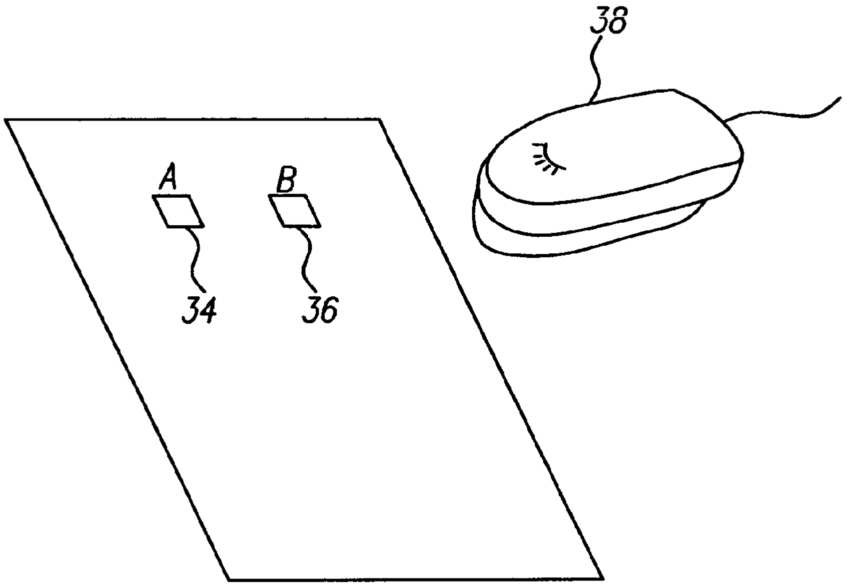
FIG. 5 illustrates a spectrophotometer used to measure two tone values from FIG. 3.

Although the prior art addresses methods of generating the density curve of FIG. 3, and deriving tone scale linearization transformations as shown in FIG. 4, from this data, it should be appreciated that a unique tone curve results from each change in the system, such as different inks and/or substrates. The present invention takes advantage of a known curve variation range for the density function shown in FIG. 4. In accordance with the present invention, it is necessary to measure only points "A" and "Z" of FIG. 4 in order to derive an accurate density as a function of the amount of ink printed. Points 34 and 36 of FIG. 3 have tone values that correspond respectively with points "A" and "Z" on FIG. 4. Measurement of these tone values is all that is required to derive the full tone scale transformation function. A spectrophotometer 38 in FIG. 5 is used to measure the two tone values "A" corresponding to point 34 of FIG. 3, and "Z" corresponding to point 36 of FIG. 3. Point "Z" is preferably the point of maximum saturation. This point represents the maximum amount of ink that can be applied to the substrate for a given printing technology. Point "A" preferably represents approximately one-third of the maximum application of ink.

A polynomial of the nth order can be fit to the actual tone scale curve of FIG. 4 using the method of least squares. The coefficients of the polynomial are varied such that the range of curves defined by the family of polynomials, all of the nth degree, is consistent with the range of actual tone scale curves that are reproducible on a press. This press variation can be the result of a number of variables. For this example, the press variations are a function of the printed substrate with other variables in the system remaining fixed. Other variables include orifice hole size, jet velocity, ink dye concentration, print speed, dryer temperature, and so forth. For the purpose of this example, a third order polynomial, with the right selection of coefficients, is sufficient to accurately model the real tone function. The point of maximum deviation from linearity is very close to the one-third level of ink application. It is appreciated that different systems may mandate the use of different critical parameters, other than the one-third level of ink application, for determining the best fit polynomial. In this example case, the upper ink limit and the one-third tone point are sufficient. Since the ink interaction with the paper substrate, although unique for each substrate selected, is similar in nature for all substrates, those skilled in the art will understand that the concept of the present invention can be extended to a vast variety of inks and substrates.

In accordance with the present invention, once the two points of interest are identified, a polynomial can be selected from a pre-stored list, or a unique polynomial can be derived from the data. It is only necessary to search a family of pre-stored functions for the one that most closely passes through the two points "A" and "Z". A software program can be used to hold the library of polynomial functions and compare each of the functions in the library to the actual input data points.

Figure 6:
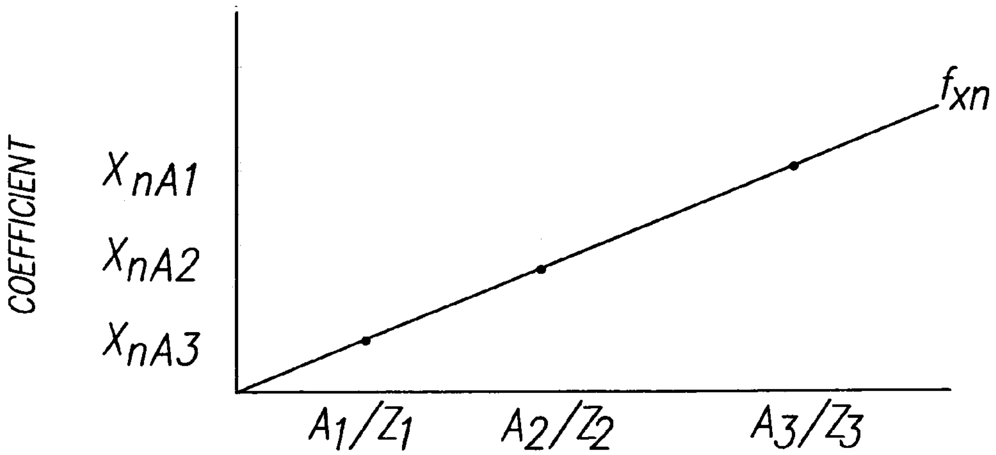
FIG. 6 represents a method for deriving the approximation polynomial curve.

The method for deriving the approximation polynomial curve fit is illustrated in FIG. 6. An nth order polynomial is fit to a set of original data, then the same order polynomial is fit to another set of real data. From these accurately measured and fit curves, all the coefficients of the polynomials are known. Then, a linear relationship is used to derive unknown coefficients of a polynomial of the same order from a single point measurement on a curve to one originally fit with known polynomials. In the drawings, the ratio of "A" to "Z" is plotted for each nth order coefficient of the known polynomial curve. In this example, a linear relationship F(x) between the tone ratio and the known coefficients is derived. This relationship allows determination of all of the unknown polynomial coefficients from the specified tone values "A" and "Z" of a given test condition.

Figure 7:
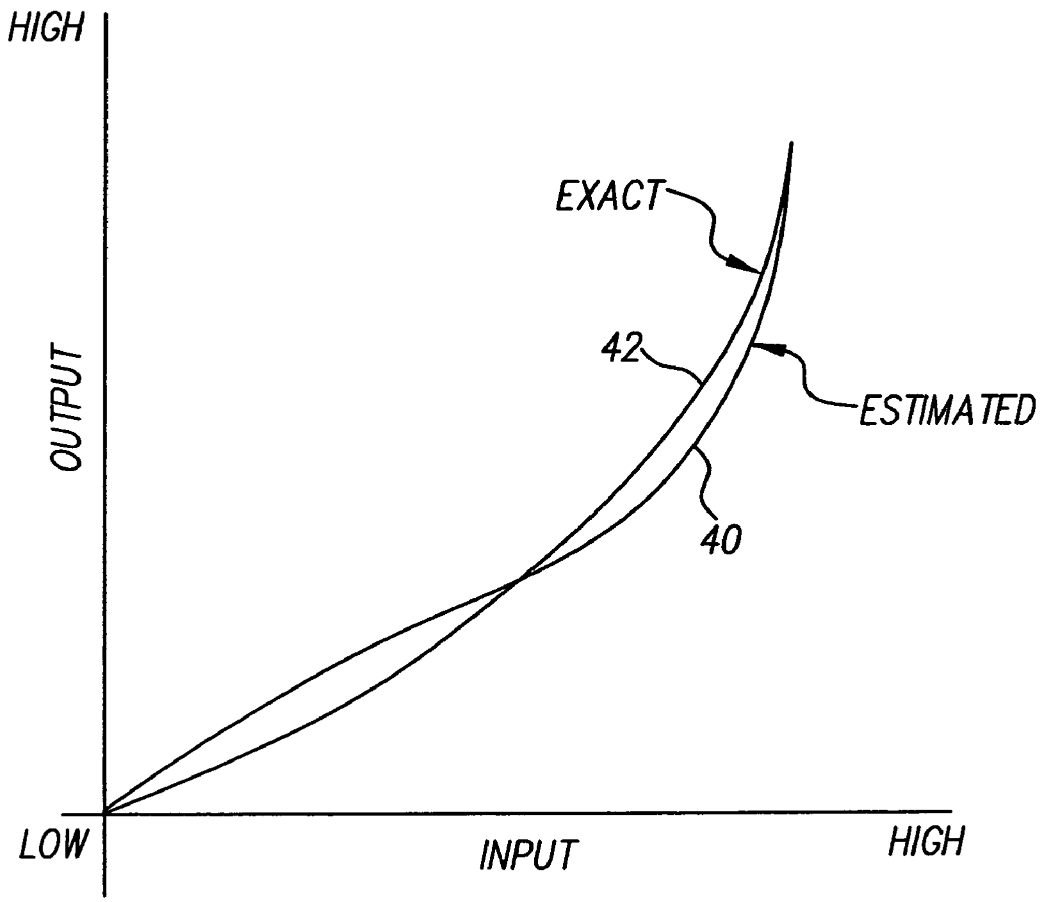
FIG. 7 is a graphical representation of an input/output transfer function derived from the measured data of FIG. 4.
Figure 8:
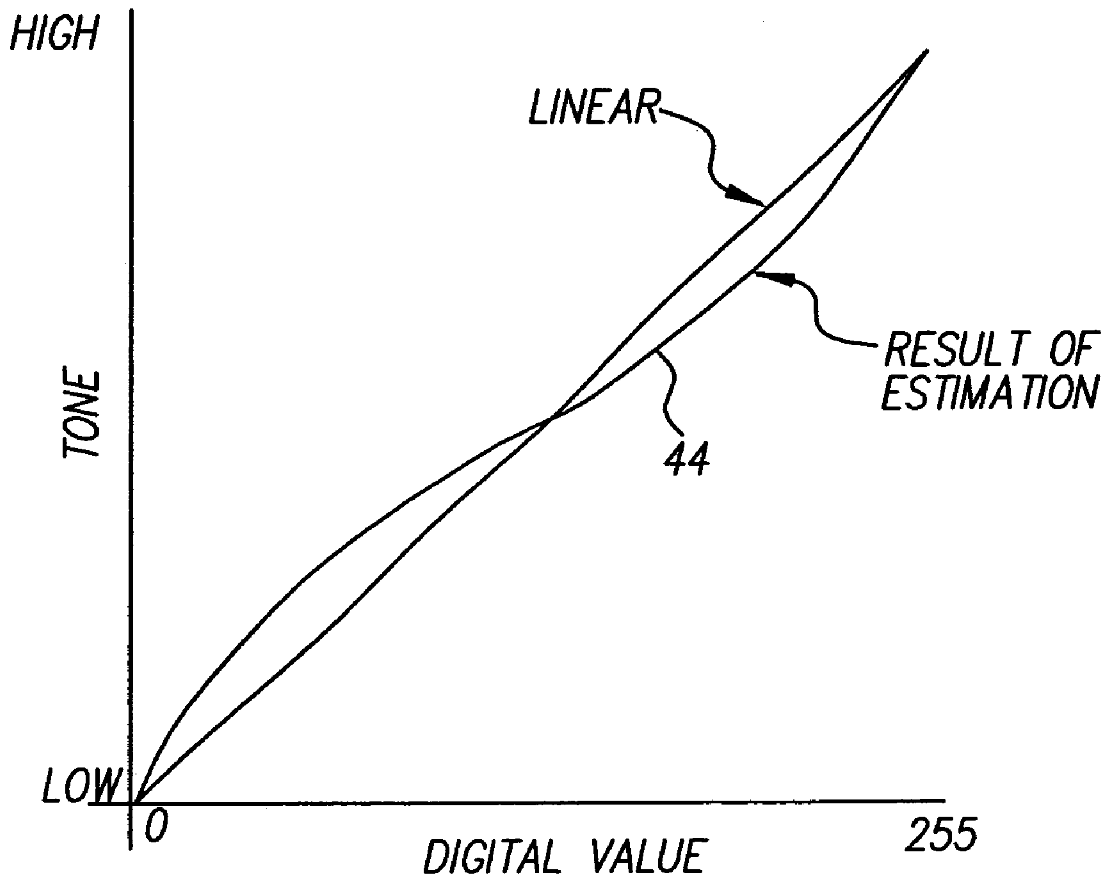
FIG. 8 is a linear tone response related to the input/output transfer function of FIG. 7.

Once an accurate polynomial model of the tone scale curve is determined, it is necessary to identify an input-output function. The input-output function is the inverse on the tone scale function. This function is applied to the image data in order to compensate for the nonlinear tone response of the system. The input-output function operates on each multi-bit value of the data file. The resultant file has linear tone when printed on the device from which the transformation curves were derived. Knowledge of the appropriate function to match the actual tone variation as a function of ink coverage allows one to linearize the system. The inverse of the tone curve is applied to the digital scale representing the amount of ink applied to the substrate. This data input/output transfer function, illustrated in FIG. 7, derived from the measured data in FIG. 4, will assure a linear tone response as illustrated in FIG. 8. As seen, in FIG. 8, however, the polynomial approximation 40 to the actual curve 42 in FIG. 7 results in error in the linearity of the applied tone scale 44. Although there is some difference between the predicted and the actual tone curve response, the difference is very small compared to other errors in the printing system. The visual difference between the approximated and the exact tone scale response in negligible.

Figure 9:
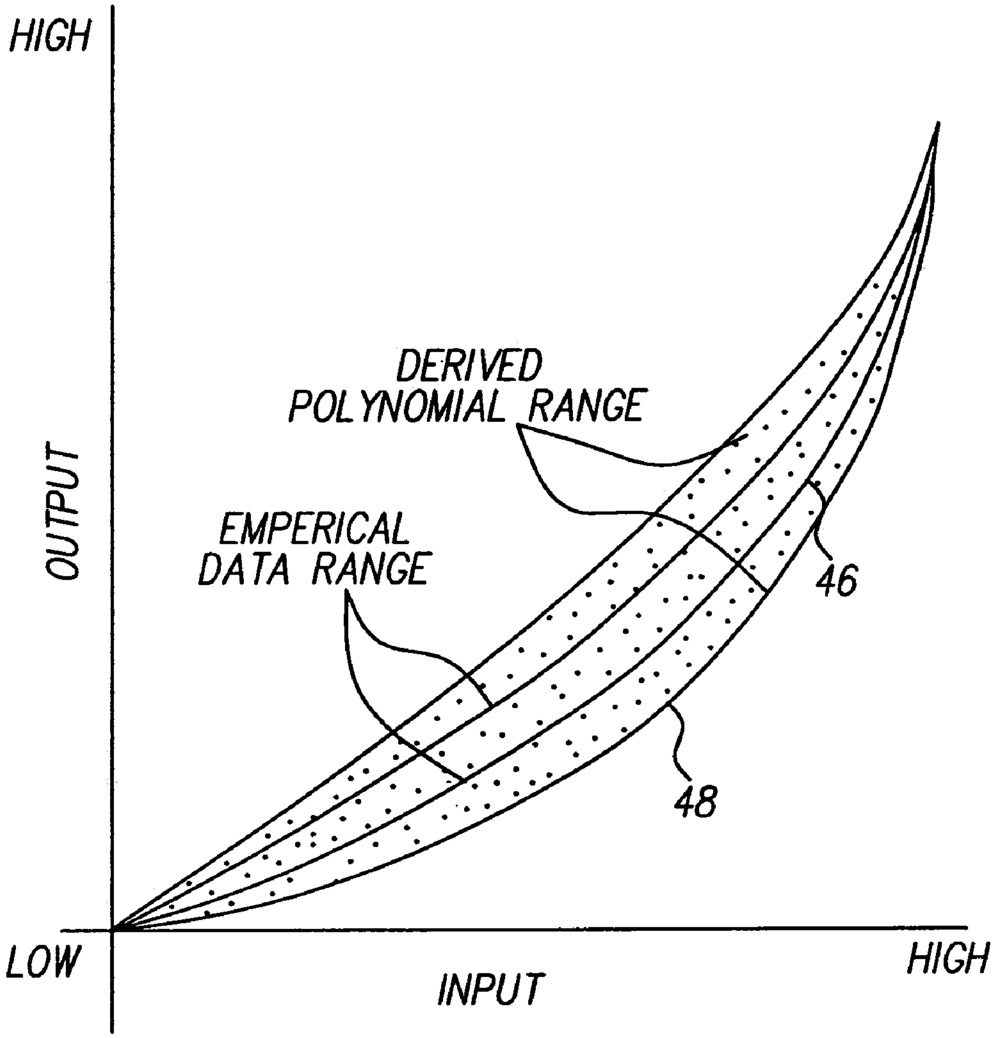
FIG. 9 is a graphic representation illustrating a range of derived polynomials.

The input-output transfer function will vary with each set of press conditions. The range of derived polynomials available through the software utility that takes advantage of the polynomial approximation method described here, extends beyond the family of empirically determined transfer functions. This is illustrated in FIG. 9. The known test cases from which the polynomial derivation methodology was applied, referenced as region 46, are inside the region 48, which is the region of application of the technology. This assures that the software utility will cover the all practical combinations of ink and paper on the press for which this linearization utility is applied.

The present invention therefore proposes a simplified method for generating a tone scale transformation for use in digital printing. Initially, as described above, a test page is printed on a known printing system and a known substrate. Image intensity data is gathered from the test page and compared to information obtained from a plurality of tone scale transformations. The image intensity data gathering preferably uses image intensity measurements at least two inking levels, such as a maximum ink level and a mid tone ink level. In a preferred embodiment, the midtone inking level is approximately a one third tone ink level. Comparing the gathered data can be accomplished by comparing a ratio of image intensity data at the two inking levels to ratios of intensity levels obtained from a plurality of transformations at similar inking levels. In a preferred embodiment of the invention, the plurality of tone scale transformations comprise a transform having a plurality of fitting parameters. Information obtained from the tone scale transformations comprises information relating image intensity ratios corresponding to the inking levels to values of each of the fitting parameters. Tone scale transformations can be selected by individually selecting values for each fitting parameter that best matches the gathered data for the known system and known substrate. The transform with the fitting parameters preferably comprises a polynomial transform. Acceptable ranges for the fitting parameters are determined from prior measurements of transforms on a variety of substrates and printing systems.

Referring now to FIG. 10, there is illustrated an exemplary user interface for inputting the values of the measured points "A" and "Z" into the transformation derivation utility. The software accommodates the construction of tone scale tables from an extended data set or from a limited two point data set. The extended data set simply fits a polynomial to the real data to derive the curve.

The concept of the present invention can be applied to various fields of endeavor, beyond the exemplary fields described herein. For example, the present invention can also be applied to control systems. If automatic feedback is available, the ability to predict performance based on minimal input data is very advantageous. For example, tone scale can be derived from a real time system that prints only points "a" and "b" in the bleed area of a high speed printing press. Modifications to the input data stream can be used to control the tone scale to maintain image consistency.

In accordance with the present invention, image transformations can be predicted from known behavior of the system and minimal input data. Specifically, a minimum number of data points are required to derive tone scale calibration. Tone scale calibration can be done on a roll to roll press without removing the paper. In a system that can accommodate real time corrections during printing, a minimum amount of information is required to be printed and sensed to identify the appropriate transformation. Software to map the input data to the appropriate function is based on known performance of the system and transform selections bracket the range of known performance. Finally, a user can specifically monitor, control, or adjust a specific point, using the concept of the present invention to assure the target value is specifically recorded.

The invention has been described in detail with particular reference to certain preferred embodiments thereof, but it will be understood that modifications and variations can be effected within the spirit and scope of the invention.

What is claimed is:

1. A simplified method for generating a tone scale transformation for use in digital printing, comprising the steps of:

printing a test page on a known printing system and a known substrate;

gathering image intensity data from the test page, using image intensity measurements at least two inking levels;

comparing the gathered data to information obtained from a plurality of tone scale transformations;

selecting the tone scale transformation that best matches the gathered data;

using the selected tone scale transformation to provide a tone scale for use on the known printing system and the known substrate and wherein the plurality of tone scale transformations comprise a transform having a plurality of fitting parameters and wherein information obtained from the plurality of tone scale transformations comprises information that relates image intensity ratios corresponding to the at least two inking levels to values of each of the fitting parameters.

2. A method as claimed in claim 1 further comprising the step of allowing a user to set a limit on maximum amount of ink to be applied to the known substrate.

3. A method as claimed in claim 1 wherein the step of gathering image intensity data using image intensity measurements at least two inking levels determines both an upper ink limit and shape of a tone scale correction curve.

4. A method as claimed in claim 1 wherein the plurality of tone scale transformations comprise a transform having a plurality of fitting parameters.

5. A method for real time or periodic system control of a digital printing system comprising the step of periodically gathering image data and selecting appropriate transforms according to the simplified method of claim 1.

6. A method as claimed in claim 5 wherein the curve shape table comprises a linearization table.

7. A method as claimed in claim 1 wherein the tone scale transformation is selected by selecting values for each fitting parameter that best matches the gathered data for the known printing system and the known substrate.

8. A simplified method for generating a tone scale transformation for use in digital printing, comprising the steps of:

printing a test page on a known printing system and a known substrate;

gathering image intensity data from the test page;

comparing the gathered data to information obtained from a plurality of tone scale transformations;

selecting the tone scale transformation that best matches the gathered data;

using the selected tone scale transformation to provide a tone scale for use on the known printing system and the known substrate;

wherein the step of gathering image intensity data comprises the step of measuring image intensity at least two inking levels to determine both an upper ink limit and shape of a tone scale correction curve; and wherein the step of comparing the gathered data comprises the step of comparing a ratio of image intensity data at the two inking levels to ratios of intensity levels obtained from a plurality of transformations at similar inking levels.

9. A method as claimed in claim 8 wherein the step of measuring image intensity at least two inking levels comprises the step of measuring image intensity at a maximum ink level and at a mid tone ink level.

10. A method as claimed in claim 9 wherein the midtone ink level comprises an approximate one third tone ink level.

11. A method as claimed in claim 8 wherein the step of gathering image intensity data comprises the step of using a spectrophotometer.

12. A simplified method for generating a tone scale transformation for use in digital printing, comprising the steps of:

printing a test page on a known printing system and a known substrate;

gathering image intensity data from the test page;

comparing the gathered data to information obtained from a plurality of tone scale transformations;

selecting the tone scale transformation that best matches the gathered data;

using the selected tone scale transformation to provide a tone scale for use on the known printing system and the known substrate; and wherein only one inkling level is required to derive a tone scale correction curve for a system with a known maximum ink tone value.

13. A simplified method for generating a tone scale transformation for use in digital printing, comprising the steps of:

printing a test page on a known printing system and a known substrate;

gathering image intensity data from the test page;

comparing the gathered data to information obtained from a plurality of tone scale transformations;

selecting the tone scale transformation that best matches the gathered data;

using the selected tone scale transformation to provide a tone scale for use on the known printing system and the known substrate;

wherein the plurality of tone scale transformations comprise a transform having a plurality of fitting parameters; and wherein information obtained from the plurality of tone scale transformations comprises information relating image intensity ratios corresponding to at least two inking levels to values of each of the plurality of fitting parameters.

14. A method as claimed in claim 13 wherein acceptable ranges for the plurality of fitting parameters are determined from prior measurements of transforms on a variety of substrates and printing systems.

15. A method as claimed in claim 13 wherein the transform having a plurality of fitting parameters comprises a polynomial transform.

16. A simplified method for generating a tone scale transformation for use in digital printing, comprising the steps of:

printing a test page on a known printing system and a known substrate;

gathering image intensity data from the test page;

comparing the gathered data to information obtained from a plurality of tone scale transformations;

selecting the tone scale transformation that best matches the gathered data;

using the selected tone scale transformation to provide a tone scale for use on the known printing system and the known substrate; and wherein the plurality of tone scale transformations comprise a transform having a plurality of fitting parameters; and wherein the step of selecting the tone scale transformation comprises the step of individually selecting values for each fitting parameter that best matches the gathered data for the known system and known substrate.

17. A method for providing information obtained from a plurality of tone scale transformations useful for simplified selection of a tone scale transformation comprising the steps of:

printing full linear ink gradations on multiple substrates;

generating a curve shape table with a plurality of points for each of the multiple substrates and/or ink gradations;

fitting a multiple parameter curve to the plurality of points of each curve shape table to generate a plurality of multiple parameter curves;

selecting at least one point in the plurality of multiple parameter curves that shows high variation from one curve to a next curve; and plotting coefficients of a group of multiple parameter curves as functions of a value of the at least one point.

18. A method as claimed in claim 17 further comprising the step of deriving a prescribed tone scale table from the plurality of polynomial curves and the at least one point.

19. A method as claimed in claim 17 further comprising the step of monitoring a specified number of variables for real time or periodic system control.

20. A method as claimed in claim 17 further comprising the step of measuring tone values.

21. A method as claimed in claim 19 wherein the step of measuring tone values comprises the step of visually comparing charts to determine a one-third tone point.

* * * * *